US010633492B2

(12) United States Patent
Kim et al.

(10) Patent No.: US 10,633,492 B2
(45) Date of Patent: Apr. 28, 2020

(54) LITHIUM SECONDARY BATTERY ANODE AND LITHIUM SECONDARY BATTERY INCLUDING SAME

(71) Applicant: LG CHEM, LTD., Seoul (KR)

(72) Inventors: Taek Gyoung Kim, Daejeon (KR); Min Chul Jang, Daejeon (KR); Byoung Kuk Son, Daejeon (KR); Doo Kyung Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/562,297

(22) PCT Filed: Dec. 17, 2015

(86) PCT No.: PCT/KR2015/013882
§ 371 (c)(1),
(2) Date: Sep. 27, 2017

(87) PCT Pub. No.: WO2017/104867
PCT Pub. Date: Jun. 22, 2017

(65) Prior Publication Data
US 2018/0051137 A1    Feb. 22, 2018

(51) Int. Cl.
*C08G 77/16* (2006.01)
*H01M 4/38* (2006.01)
(Continued)

(52) U.S. Cl.
CPC .......... *C08G 77/16* (2013.01); *H01M 4/0407* (2013.01); *H01M 4/134* (2013.01); *H01M 4/139* (2013.01);
(Continued)

(58) Field of Classification Search
CPC .... C08G 77/16; H01M 4/1395; H01M 4/623; H01M 4/382; H01M 4/661; H01M 4/666;
(Continued)

(56) References Cited

U.S. PATENT DOCUMENTS 5,961,672 A    10/1999    Skotheim et al.
6,402,795 B1    6/2002    Chu et al.
(Continued)

FOREIGN PATENT DOCUMENTS

JP    2000-315523 A    11/2000
JP    2002-158035 A    5/2002
(Continued)

OTHER PUBLICATIONS

English Translation of KR20130004084 (Year: 2013).*
(Continued)

*Primary Examiner* — Andrew J. Oyer
(74) *Attorney, Agent, or Firm* — Birch, Stewart, Kolasch & Birch, LLP (57) ABSTRACT

The present invention relates to a negative electrode for lithium secondary battery and a lithium secondary battery including the same. The negative electrode includes a negative electrode active layer comprising lithium, and a protective layer disposed on the negative electrode active layer, wherein the protective layer comprises a polymer matrix having a three dimensional crosslinked network structure of polymer or includes a non-crosslinked linear polymer, and an electrolyte in the polymer matrix in the amount of 100 to 1000 parts by weight based on 100 parts by weight of the polymer matrix. The negative electrode according to the present invention has no concern about loss of electrolyte and the resulting deterioration of battery life characteristics even during the repetitive charging/discharging of the battery and has improved battery stability due to the inhibition of growth of lithium dendrite.

11 Claims, 5 Drawing Sheets (51) Int. Cl.

| | | |
|---|---|---|
| *H01M 4/62* | (2006.01) | |
| *H01M 4/1395* | (2010.01) | |
| *H01M 4/04* | (2006.01) | |
| *H01M 4/134* | (2010.01) | |
| *H01M 4/58* | (2010.01) | |
| *H01M 4/66* | (2006.01) | |
| *H01M 10/052* | (2010.01) | |
| *H01M 4/139* | (2010.01) | |
| *H01M 4/36* | (2006.01) | |
| *H01M 2/02* | (2006.01) | |
| *H01M 4/485* | (2010.01) | |
| *H01M 4/525* | (2010.01) | |
| *H01M 4/02* | (2006.01) | |

(52) U.S. Cl.
CPC ......... *H01M 4/1395* (2013.01); *H01M 4/382* (2013.01); *H01M 4/5815* (2013.01); *H01M 4/622* (2013.01); *H01M 4/623* (2013.01); *H01M 4/661* (2013.01); *H01M 4/666* (2013.01); *H01M 4/667* (2013.01); *H01M 4/668* (2013.01); *H01M 10/052* (2013.01); *H01M 2/0217* (2013.01); *H01M 4/366* (2013.01); *H01M 4/485* (2013.01); *H01M 4/525* (2013.01); *H01M 2004/027* (2013.01); *H01M 2300/0042* (2013.01)

(58) Field of Classification Search
CPC .. H01M 4/667; H01M 4/0407; H01M 4/5815; H01M 4/668; H01M 4/622; H01M 4/134; H01M 10/052; H01M 4/139; H01M 4/366; H01M 2/0217; H01M 2300/0042; H01M 4/525; H01M 2004/027; H01M 4/485
See application file for complete search history.

(56) References Cited

U.S. PATENT DOCUMENTS

| | | | | |
|---|---|---|---|---|
| 7,514,180 | B2* | 4/2009 | Li | H01M 2/1653 429/231.95 |
| 2002/0187398 | A1 | 12/2002 | Mikhaylik et al. | |
| 2003/0124431 | A1* | 7/2003 | Hwang | C08F 220/22 429/316 |
| 2004/0072066 | A1 | 4/2004 | Cho et al. | |
| 2004/0170898 | A1 | 9/2004 | Shibuya et al. | |
| 2005/0008938 | A1 | 1/2005 | Cho et al. | |
| 2005/0042515 | A1 | 2/2005 | Hwang et al. | |
| 2005/0095504 | A1 | 5/2005 | Kim et al. | |
| 2005/0196677 | A1 | 9/2005 | Lee et al. | |
| 2006/0251970 | A1 | 11/2006 | Lee et al. | |
| 2010/0248026 | A1 | 9/2010 | Hinoki et al. | |
| 2010/0297510 | A1 | 11/2010 | Kim et al. | |
| 2011/0091774 | A1 | 4/2011 | Wakizaka et al. | |
| 2014/0093784 | A1 | 4/2014 | Kwon et al. | |
| 2014/0106236 | A1 | 4/2014 | Kwon et al. | |
| 2015/0255782 | A1* | 9/2015 | Kim | H01M 4/0416 429/405 |
| 2016/0133903 | A1* | 5/2016 | Choi | H01M 2/1653 429/254 |
| 2016/0204476 | A1 | 7/2016 | Kobayashi | |

FOREIGN PATENT DOCUMENTS

| | | | |
|---|---|---|---|
| JP | 5359444 | B2 | 12/2013 |
| JP | 2014025157 | A * | 2/2014 |
| KR | 10-1999-0055229 | A | 7/1999 |
| KR | 10-2001-0024927 | A | 3/2001 |
| KR | 10-0359605 | B1 | 11/2002 |
| KR | 10-2003-0066746 | A | 8/2003 |
| KR | 10-2004-0035909 | A | 4/2004 |
| KR | 10-2004-0043414 | A | 5/2004 |
| KR | 10-2005-0007484 | A | 1/2005 |
| KR | 10-2005-0041661 | A | 5/2005 |
| KR | 10-2005-0103068 | A | 10/2005 |
| KR | 10-2006-0110236 | A | 10/2006 |
| KR | 10-0999168 | B1 | 12/2010 |
| KR | 10-2011-0005793 | A | 1/2011 |
| KR | 10-1141056 | B1 | 5/2012 |
| KR | 10-2013-0004090 | A | 1/2013 |
| KR | 20130004084 | A * | 1/2013 |
| KR | 10-1393534 | B1 | 5/2014 |
| WO | WO 2015/030230 | A1 | 3/2015 |

OTHER PUBLICATIONS

English Translation of JP2014025157 (Year: 2014).*
Extended European Search Report, dated Sep. 17, 2018, for European Application No. 15910790.3.
Chinnam et al., "Polyoctahedral Silsesquioxane-Nanoparticle Electrolytes for Lithium Batteries: POSS-Lithium Salts and POSS-PEGs", Chemistry of Materials, vol. 23, 2011, pp. 5111-5121.
Choi et al., "Protective coating of lithium metal electrode for interfacial enhancement with gel polymer electrolyte", Solid State Ionics, vol. 172, 2004, pp. 19-24.
International Search Report issued in PCT/KR2015/013882 (PCT/ISA/210), dated Aug. 2, 2016.
Song et al., "Effect of Fluoroethylene Carbonate on Electrochemical Performances of Lithium Electrodes and Lithium-Sulfur Batteries", Journal of The Electrochemical Society, vol. 160, No. 6, 2013, pp. A873-A881.

* cited by examiner

LITHIUM SECONDARY BATTERY ANODE AND LITHIUM SECONDARY BATTERY INCLUDING SAME

TECHNICAL FIELD

The present invention relates to a negative electrode for lithium secondary battery which has no concern about loss of electrolyte and the resulting deterioration of battery life characteristics even during the repetitive charging/discharging of the battery and has improved stability due to the inhibition of growth of lithium dendrite, and a lithium secondary battery including the same.

BACKGROUND ART

A lithium secondary battery (for example, a lithium ion battery), a nickel hydrogen battery and other secondary batteries become increasingly important as an in-vehicle power supply or as a power supply for portable devices such as notebook, etc. In particular, the lithium secondary battery capable of obtaining a high energy density with a lightweight may be preferably utilized as an in-vehicle high output power supply, and thus its continuously increased demand is expected in the future.

The lithium secondary battery uses a material capable of intercalation and deintercalation of lithium ions as negative electrode and negative electrode active material, and is prepared by interposing a porous separator between positive electrode and negative electrode and then injecting liquid electrolyte. Electric power is generated or consumed by a redox reaction due to the intercalation and deintercalation of lithium ions in the negative electrode and the positive electrode.

However, loss and depletion of the electrolyte may occur due to the volume change of electrode during the repetitive charging/discharging of the battery, thereby causing the problem that battery driven process is not continued.

For this reason, development of an electrode material capable of inhibiting the loss of electrolyte to improve the battery life characteristics and also inhibiting the growth of lithium dendrite to improve the stability of lithium electrode is demanded.

PRIOR ART

Patent Document

Korean Patent No. 10-0359605 (Registered on Oct. 22, 2002)

DISCLOSURE

Technical Problem

An object of the present invention is to provide a negative electrode which has no concern about loss of electrolyte and the resulting deterioration of battery life characteristics even during the repetitive charging/discharging of the battery and has excellent stability due to the inhibition of growth of lithium dendrite.

Another object of the present invention is to provide a lithium secondary battery including the negative electrode thereby having the improved battery performance and stability.

Technical Solution

One embodiment of the present invention provides a negative electrode for lithium secondary battery, which comprises a negative electrode active layer comprising a lithium metal or an alloy of lithium metal, and a protective layer disposed on the negative electrode active layer, wherein the protective layer comprises a polymer matrix having a three dimensional crosslinked network structure of polymer or including a non-crosslinked linear polymer, and an electrolyte in the polymer matrix in the amount of 100 to 1000 parts by weight, based on 100 parts by weight of the polymer matrix.

The protective layer may comprise a porous polymer matrix having the three dimensional crosslinked network structure of polymer, and the electrolyte may be contained inside the pore of the porous polymer matrix.

The porous polymer matrix may have a porosity of 5 to 80% by volume.

The three dimensional crosslinked network may be formed through a cross-link selected from the group consisting of chemical crosslinking by a branch chain between polymers, coupling between one or more monomers having reactive multifunctional groups, physical crosslinking of cluster domains formed by phase separation of block copolymers, and ionic crosslinking of ionomers.

The polymer matrix may comprise a crosslinked polymer of polydimethylsiloxane or its derivatives.

The polymer matrix may comprise a polysilsesquioxane.

The polymer matrix may comprise a three dimensional covalent organic framework by the coupling between two or more monomers having reactive multifunctional groups.

The polymer matrix may comprise one substituent selected from the group consisting of sulfonic acid group ($SO_3H$), phosphoric acid group ($PO_4H_2$), carbonic acid group ($CO_3H$) and combinations thereof, and an anionic polymer electrolyte in which some or all of these substituents are self-doped with lithium.

The protective layer may comprise a structure in which non-crosslinked linear polymers having a weight average molecular weight of 1,000,000 g/mol or more are entangled with each other, and the electrolyte may be loaded in the structure.

The non-crosslinked linear polymer may be one selected from the group consisting of polyethylene oxide, polypropylene oxide, polyacrylonitrile, polyvinylidene fluoride-hexafluoropropylene, polyvinylidene fluoride-trichloroethylene, polymethylmethacrylate, polystyrene-acrylonitrile copolymer, polyvinyl chloride, polyvinylpyrrolidone, polyvinyl acetate, polyethylene vinyl acetate copolymer, and mixtures thereof.

The protective layer may have the thickness of 1 nm to 10 µm.

The electrolyte may be absorbed in the polymer which forms the polymer matrix.

Another embodiment of the present invention provides a method for preparing a negative electrode for lithium secondary battery which comprises the steps of preparing a negative electrode active layer which comprises lithium; forming a polymer matrix which has a three dimensional crosslinked network structure of polymer or includes a non-crosslinked linear polymer on the negative electrode active layer; and impregnating, coating or spraying an electrolyte in the amount of 100 to 1000 parts by weight based on 100 parts by weight of the polymer matrix so that the electrolyte is contained in the polymer matrix to form a protective layer.

Still another embodiment of the present invention provides a lithium secondary battery which comprises a positive electrode and a negative electrode which are arranged to face each other; a separator interposed between the positive electrode and the negative electrode; and a non-aqueous electrolyte, wherein the negative electrode includes a negative electrode active layer comprising lithium, and a protective layer disposed on the negative electrode active layer, wherein the protective layer comprises a polymer matrix having a three dimensional crosslinked network structure of polymer or including a non-crosslinked linear polymer, and an electrolyte in the polymer matrix in the amount of 100 to 1000 parts by weight, based on 100 parts by weight of the polymer matrix.

The other detailed descriptions on the embodiments of the present invention will be made below.

Advantageous Effects

The negative electrode for lithium secondary battery of the present invention has no concern about loss of electrolyte and the resulting deterioration of battery life characteristics even during the repetitive charging/discharging of the battery and has improved stability due to the inhibition of growth of lithium dendrite.

BEST MODE

Hereinafter, the present invention will be explained in detail by referring to the accompanying drawings for the examples of the present invention so that a person of ordinary skill in the art may easily practice the invention. However, the present invention may be realized in many different forms and should not be construed as limited to the embodiments set forth herein.

The terms are used in the present invention for illustrating only certain examples, and are not intended to limit the present invention. The singular forms "a", "an" and "the" include the plural forms unless the context clearly dictates otherwise. The terms "comprise," "include," "have," etc. as used herein should be understood to indicate the presence of features, figures, steps, actions, elements, components, or combinations thereof described in the present specification, but not to exclude in advance the possibility of presence or addition of one or more other features, figures, steps, actions, elements, components, or combinations thereof.

The present invention has the feature that a protective layer capable of protecting the negative electrode and simultaneously accumulating the electrolyte is formed during the preparation of the negative electrode on the negative electrode active layer comprising the negative electrode active material so that there is no concern about loss of electrolyte and the resulting deterioration of battery life characteristics even during the repetitive charging/discharging of the battery and the stability of battery is improved due to the inhibition of growth of lithium dendrite.

In other words, the negative electrode for lithium secondary battery according to one embodiment of the present invention includes a negative electrode active layer comprising a lithium metal or an alloy of lithium metal, and a protective layer disposed on the negative electrode active layer, wherein the protective layer comprises a polymer matrix having a three dimensional crosslinked network structure of polymer or including a non-crosslinked linear polymer, and an electrolyte in the polymer matrix in the amount of 100 to 1000 parts by weight, based on 100 parts by weight of the polymer matrix.

Specifically, in the negative electrode, the negative electrode active layer comprises a lithium metal or an alloy of lithium metal as negative electrode active material capable of reversible intercalation and deintercalation of lithium.

The alloy of lithium metal, specifically, may be an alloy of lithium with a metal of Si, Al, Sn, Pb, Zn, Bi, In, Mg, Ga, or Cd.

In addition, the negative electrode active layer may optionally further comprises a binder along with the negative electrode active material.

The binder plays such roles as making a paste of negative electrode active material, adhesion between the active materials, adhesion between the active material and the current collector, buffering effect against the expansion and contraction of active materials, etc. Specifically, the binder may be polyvinyl alcohol, carboxymethyl cellulose, hydroxypropyl cellulose, polyvinyl chloride, polyvinyl chloride carboxylate, polyvinyl fluoride, a polymer including ethylene oxide, polyvinylpyrrolidone, polyurethane, polytetrafluoroethylene, polyvinylidene fluoride (PVDF), polyethylene, polypropylene, styrene-butadiene rubber, styrene-butadiene acrylate rubber, epoxy resin, nylon, etc., but not limited thereto. It may be desirable that the binder is contained in the amount of 20% by weight or less, or 5 to 15% by weight, based on a total weight of the negative electrode active layer.

In the negative electrode for lithium secondary battery, the protective layer is disposed on the negative electrode active layer, wherein the protective layer comprises a polymer matrix and an electrolyte contained in the polymer matrix.

Specifically, the polymer matrix has a three dimensional crosslinked network structure of polymer or includes a non-crosslinked linear polymer.

More specifically, when the polymer matrix has the three dimensional crosslinked network structure of polymer, the three dimensional crosslinked network structure may be formed through a cross-link selected from the group consisting of chemical crosslinking by a branch chain between polymers, coupling between one or more monomers having reactive multifunctional groups, physical crosslinking of cluster domains formed by phase separation of block copolymers, and ionic crosslinking of ionomers.

The specific example for the chemical crosslinking by a branch chain between polymers includes a crosslinked structure formed by a crosslinking of a main chain via a branch chain which acts as a crosslinker, such as for example, polydimethylsiloxane (PDMS) or derivatives thereof.

In addition, the specific example for the formation of a three dimensional crosslinked network structure through the coupling between one or more monomers having reactive multifunctional groups includes the formation of polysilsesquioxane via the organic-inorganic sol-gel reaction of single monomers having the following Formula 1:

[Formula 1]

(In Formula 1, $R_1$ is a straight-chain, branched, or cyclic divalent hydrocarbon group (for example, alkylene group, benzene group, etc.) and may include a lithium ion-conductive moiety such as oligoethylene glycol, etc.)

Here, the monomers of the Formula 1, which react with each other, may include $R_1$ moieties different from each other. For example, one monomer of the Formula 1 wherein $R_1$ is a moiety capable of well delivering a lithium ion and another monomer of the Formula 1 wherein $R_1$ is a moiety capable of providing excellent mechanical strength may be coupled to form a three dimensional crosslinked network structure.

In addition, the specific example for the formation of three dimensional crosslinked network structure through the coupling between two or more monomers includes the formation of a three dimensional covalent organic framework via the coupling of a monomer of Formula 2 with a compound of Formulae 3a to 3c, as depicted in the following Reaction Scheme 1:

[Reaction Scheme 1]

In Formulae 2 and 3a~3c, R and R' each independently are a straight-chain, branched, or cyclic hydrocarbon group and may further include a lithium ion-conductive moiety such as oligoethylene glycol, etc., and X and Y are a functional group capable of forming a crosslinking by reacting with each other, wherein X is an amino group or a hydroxyl group, and Y is an isocyanate group, a carboxylic acid group, or an aldehyde group. X and Y react with each other through the exchange of an electron. At this time, Y may be an amino group or a hydroxyl group and X may be an isocyanate group, a carboxylic acid group, or an aldehyde group for the smooth reaction depending on the electronegativity of R or R'.

Even though Formulae 2 and 3a~3c in Reaction Scheme 1 are illustrated to include X or Y, respectively, the present invention is not limited thereto, and it is also possible that Formulae 2 and 3a~3c include X and Y in one molecule at the same time.

Figure 5:
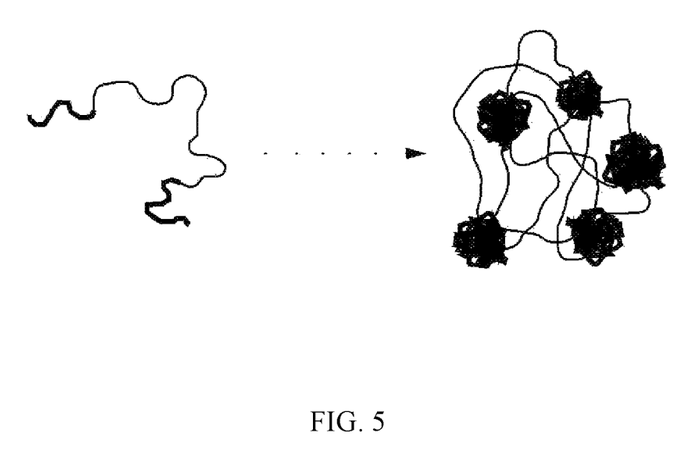
FIG. 5 is a diagram showing Reaction Scheme 2.

In addition, the specific example for the physical crosslinking of cluster domains formed by phase separation of block copolymers includes the physical crosslinking of block copolymers as depicted in Reaction Scheme 2, which is shown in FIG. 5. Reaction Scheme 2 is only a diagram for illustrating the physical crosslinking of block copolymers, and the present invention is not limited thereto.

In addition, the block copolymers may include a block capable of the intramolecular ionic conduction to minimize the resistance.

The specific example for the ionic crosslinking of ionomers includes the ionic crosslinking of ionomers wherein the proton of polysulfonic acid is replaced by lithium as depicted in the following Formula (I):

The ionomer may be an anionic polymer electrolyte which is self-doped with lithium, specifically a polymer which includes one substituent selected from the group consisting of sulfonic acid group ($SO_3H$), phosphoric acid group ($PO_4H_2$), carbonic acid group ($CO_3H$) and combinations thereof, wherein some or all of the substituents are self-doped with lithium. And more specifically a polymer wherein a side chain end thereof is substituted by a sulfonic acid group, such as for example, polystyrene sulfonate and wherein $SO_3H$ is replaced by $SO_3Li$.

The ionic crosslinked ionomer as mentioned above consists of a single lithium ion conductive polymer. It may inhibit the anion transfer but at the same time allow lithium ions transfer only to minimize the concentration gradient between ions and consequently to inhibit the dendrite formation.

The three dimensional crosslinked network structure is formed through a crosslinking of polymer chains, so that pores in the structure can be formed. As a result, the polymer matrix may be a porous polymer matrix wherein the electrolyte may be included in the pores of the porous polymer matrix.

Specifically, it may be desirable that the polymer matrix has a porosity of 5 to 80% by volume based on a total volume of the polymer matrix. The content of electrolyte solution impregnated and contained in the pore is low and thus the effect of improvement due to the formation of polymer matrix is trivial when the porosity is less than 5% by volume, and there is a concern of deterioration of the mechanical property of the polymer matrix itself when the porosity exceeds 80% by volume. However, in case of the three dimensional network structure, the organic moiety inserted may be suitably controlled even when the porosity exceeds 80% by volume and the content ratio of each monomer may be controlled when two or more monomers are used to prevent deterioration of the mechanical property.

In addition, the polymer forming the polymer matrix may absorb the electrolyte to expand the porous polymer matrix depending on the degree of crosslinking. According to this, the electrolyte may be included in the polymer.

On the other hand, in case that the polymer matrix includes the non-crosslinked linear polymer, the electrolyte may be absorbed in the inside of the non-crosslinked linear polymers, or may be loaded between the non-crosslinked linear polymers entangled with each other.

When the non-crosslinked linear polymer absorbs the electrolyte, it may be expanded as the electrolyte injected is absorbed, and at the same time it may show the ionic conductivity due to the absorbed electrolyte. The more the amount of electrolyte absorbed into the non-crosslinked linear polymer is, the higher the ionic conductivity is. However, if the amount of electrolyte absorbed is too high, the mechanical property of the polymer matrix may be deteriorated. Thus, it may be desirable that the non-crosslinked linear polymer has the rate of expansion by the electrolyte, which is calculated based on the following Equation 1, of 300 to 700% by weight or 400 to 500% by weight:

Rate of Expansion (%)=$P2/P1 \times 100$     [Equation 1]

In the equation 1, P1 is a weight after dry of the test specimen of polymer compound of which thickness is adjusted to 100 μm, and P2 is a weight after impregnation of 10 hours in the electrolyte solution at 25° C.

The non-crosslinked linear polymer having the rate of expansion of the aforementioned range shows a high degree of swelling, and thus free transfer of the ion constituting the electrolyte is possible during the contact of anode with electrolyte solution. Consequently, the battery performance may be improved due to the increased conductivity of the electrolyte ion.

Specifically, the non-crosslinked linear polymer may be polyethylene oxide, polypropylene oxide, polyacrylonitrile, polyvinylidene fluoride-hexafluoropropylene, polyvinylidene fluoride-trichloroethylene, polymethylmethacrylate, polystyrene-acrylonitrile copolymer, polyvinyl chloride, polyvinylpyrrolidone, polyvinyl acetate, polyethylene vinyl acetate copolymer, etc. alone or mixtures of two or more thereof. Only, since the anode according to the present invention comprises a lithium-based compound such as a lithium metal or a lithium alloy as the anode active material, it may be suitably selected from the above non-crosslinked linear polymers for forming the protective layer considering the interfacial compatibility with lithium.

In addition, when the non-crosslinked linear polymer is a homopolymer having the weight average molecular weight of 1,000,000 g/mol or more, it is included in the polymer matrix in the entangled state, and it can load the electrolyte due to such an entangled structure.

On the other hand, the electrolyte included in the polymer matrix may comprise an organic solvent and a lithium salt.

As the organic solvent, any one capable of playing a role as a medium through which the ions participating in the electrochemical reaction of battery can move may be used without special limit. Specifically, the organic solvent may include an ester solvent, an ether solvent, a ketone solvent, an aromatic hydrocarbon solvent, an alkoxyalkane solvent, a carbonate solvent, etc. alone or mixtures of two or more thereof.

As the specific example of the ester solvent, methyl acetate, ethyl acetate, n-propyl acetate, dimethyl acetate, methyl propionate, ethyl propionate, γ-butyrolactone, decanolide, γ-valerolactone, mevalonolactone, γ-caprolactone, δ-valerolactone, ε-caprolactone, etc. may be mentioned.

As the specific example of the ether solvent, dibutyl ether, tetraglyme, 2-methyltetrahydrofuran, tetrahydrofuran, etc. may be mentioned.

As the specific example of the ketone solvent, cyclohexanone, etc. may be mentioned. As the specific example of the aromatic hydrocarbon solvent, benzene, fluorobenzene, chlorobenzene, iodobenzene, toluene, fluorotoluene, xylene, etc. may be mentioned. As the alkoxyalkane solvent, dimethoxy ethane, diethoxy ethane, etc. may be mentioned.

As the specific example of the carbonate solvent, dimethylcarbonate (DMC), diethylcarbonate (DEC), dipropylcarbonate (DPC), methylpropylcarbonate (MPC), ethylpropylcarbonate (EPC), methylethylcarbonate (MEC), ethylmethylcarbonate (EMC), ethylene carbonate (EC), propylene carbonate (PC), butylene carbonate (BC), fluoroethylene carbonate (FEC), etc. may be mentioned.

The lithium salt may include any compound capable of providing a lithium ion used in the lithium secondary battery without special limit. Specifically, the lithium salt may be one selected from the group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiN(C_aF_{2a+1}SO_2)(C_bF_{2b+1}SO_2)$ (provided that a and b are natural numbers, preferably $1 \leq a \leq 20$ and $1 \leq b \leq 20$), LiCl, LiI, $LiB(C_2O_4)_2$, and mixtures thereof, and it is preferable to use lithium hexafluorophosphate ($LiPF_6$).

When the lithium salt is dissolved in the electrolyte, the lithium salt acts as a source for lithium ions in the lithium secondary battery, and it may facilitate the transfer of lithium ions between positive and negative electrode. Therefore, it is preferable that the lithium salt is included in the electrolyte in the concentration of about 0.6 mol % to 2 mol %. The conductivity of electrolyte may be lowered to deteriorate the electrolyte performance when the concentration of lithium salt is less than 0.6 mol %, and the viscosity of electrolyte may be raised to lower the transferability of lithium ions when the concentration of lithium salt exceeds 2 mol %. Considering the conductivity of electrolyte and the transferability of lithium ions, it may be more preferable that the lithium salt is controlled in the electrolyte to the concentration of about 0.7 mol % to 1.6 mol %.

The electrolyte may further comprise some additives ('other additives,' below) that can be commonly used in the electrolyte for the purpose of improvement of battery life characteristics, inhibition of decrease of battery capacity, improvement of battery discharge capacity, etc., besides the above explained components of electrolyte.

As the specific example of the other additives, vinylene carbonate (VC), metal fluoride, for example, LiF, RbF, TiF, AgF, $AgF_2$, $BaF_2$, $CaF_2$, $CdF_2$, $FeF_2$, $HgF_2$, $Hg_2F_2$, $MnF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $DyF_3$, $EuF_3$, $GaF_3$, $GdF_3$, $FeF_3$, $HoF_3$, $InF_3$, $LaF_3$, $LuF_3$, $MnF_3$, $NdF_3$, $PrF_3$, $SbF_3$, $ScF_3$, $SmF_3$, $TbF_3$, $TiF_3$, $TmF_3$, $YF_3$, $YbF_3$, $TIF_3$, $CeF_4$, $GeF_4$, $HfF_4$, $SiF_4$, $SnF_4$, $TiF_4$, $VF_4$, $ZrF4_4$, $NbF_5$, $SbF_5$, $TaF_5$, $BiF_5$, $MoF_6$, $ReF_6$, $SF_6$, $WF_6$, $CoF_2$, $CoF_3$, $CrF_2$, CsF, $ErF_3$, $PF_3$, $PbF_3$, $PbF_4$, $ThF_4$, $TaF_5$, $SeF_6$, etc.), glutaronitrile (GN), succinonitrile (SN), adiponitrile (AN), 3,3'-thiodipropionitrile (TPN), vinylethylene carbonate (VEC), fluoroethylene carbonate (FEC), difluoroethylene carbonate, fluorodimethyl carbonate, fluoroethylmethyl carbonate, lithium bis(oxalato) borate (LiBOB), lithium difluoro (oxalate) borate (LiDFOB), lithium (malonato oxalato) borate (LiMOB), etc. alone or mixtures of two or more thereof may be mentioned. These other additives may be contained in the amount of 0.1 to 5% by weight based on the total weight of the electrolyte.

In addition, it may be desirable that the electrolyte is included in the amount of 100 to 1000 parts by weight based on 100 parts by weight of the polymer matrix. When it is included in this weight ratio, higher charging/discharging efficiency may be obtained. The ionic conductivity in the protective layer is so low that there is a concern about deterioration of battery characteristics when the content of electrolyte is less than 100 parts by weight, and an excessively large amount of electrolyte is gathered to the anode so that the distribution map of electrolyte up to the cathode is not uniform and consequently there is a concern about deterioration of performance when the content of electrolyte exceeds 1000 parts by weight. Also, even when the content of electrolyte is 100 parts by weight, if the organic-inorganic sol-gel reaction is applied or two or more monomers are used, the problem caused by the decline of ionic conductivity may be solved by letting the organic block inserted have the ionic conductivity.

It may be desirable that the protective layer has the thickness of 1 nm to 10 μm. When the thickness of protective layer is less than 1 nm, the side reactions and the exothermic reactions between the electrolyte and the electrode active materials, which increase under the conditions of overcharge, high temperature storage, etc., are not effectively prevented thereby not achieving the improvement of stability. Also, when the thickness exceeds 10 μm, a long period of time is required for the polymer matrix in the protective layer to be impregnated or swelled by the electrolyte, and the lithium ion transfer may be inhibited to deteriorate the overall battery performance. Considering the remarkable improvement due to the formation of protective layer, it may be more desirable that the protective layer is formed in the thickness of 10 nm to 1 μm.

The negative electrode may further include a current collector for supporting the negative electrode active layer.

Specifically, the current collector may be any one metal selected from the group consisting of copper, aluminum, stainless steel, titanium, silver, palladium, nickel, alloys thereof, and combinations thereof, wherein the stainless steel may be surface-treated with carbon, nickel, titanium or silver, and wherein the alloy may preferably be an aluminum-cadmium alloy. Besides the above, baked carbon, a nonconductive polymer of which surface is treated with a conductive material, a conductive polymer, etc. may be used.

The negative electrode having the structure according to the present invention may be prepared by a method comprising the steps of preparing a negative electrode active layer which comprises lithium; forming a polymer matrix which has a three dimensional crosslinked network structure or includes a non-crosslinked linear polymer, on the negative electrode active layer; impregnating, coating or spraying an electrolyte on the polymer matrix so that the electrolyte is contained in the polymer matrix to form a protective layer.

Each step is explained in detail below. Step 1 is a step of forming a negative electrode active layer, wherein negative electrode active material and optionally a binder and a conductive material are mixed to prepare a composition for forming the negative electrode active layer, and this composition is applied to a negative electrode current collector and then dried to form a negative electrode active material layer. Or, a thin film of lithium metal per se may be used as the negative electrode active layer without any further process.

The composition for forming a negative electrode active layer may be prepared by dispersing a negative electrode active material and optionally a binder and a conductive material in a solvent, and the types and contents of the available negative electrode active material, binder and conductive material are as described above.

Preferably, the solvent may be dimethyl sulfoxide (DMSO), an alcohol, N-methylpyrrolidone (NMP), acetone, water, and like.

The composition for forming a negative electrode active material layer as prepared above may be applied on a current collector by a method known in the art or by a new and suitable method considering the characteristics of material, etc. For example, it is desirable that the composition for forming a negative electrode active material layer is distributed on the current collector and then uniformly dispersed using a doctor blade, etc. If necessary, both of the distribution and dispersion may be carried out in one process. Besides the above, such methods as die casting, comma coating, screen printing, etc. may be used. At this time, the current collector is the same as explained above.

Thereafter, the negative electrode active layer formed on the current collector may be dried, and the drying process may be carried out by such methods as heat treatment, hot-air drying, etc. at the temperature of 80 to 120° C.

In addition, after the drying, the negative electrode mixture thus prepared may be optionally further subjected to such a process as rolling, etc. to have a suitable mixture density. The rolling may be carried out according to a rolling method in the typical preparation of electrode, and thus detailed description thereon is omitted.

Subsequently, Step 2 is a step of forming a polymer matrix on the negative electrode active layer prepared above.

Specifically, the polymer matrix may be formed through a chemical crosslinking by a branch chain between polymers, a coupling between one or more monomers having reactive multifunctional groups, a physical crosslinking of cluster domains formed by phase separation of block copolymers, or an ionic crosslinking of ionomers, or it may be formed by non-crosslinked linear polymers.

Thus, a composition for forming a polymer matrix prepared by dissolving or dispersing a compound for forming a polymer matrix, i.e., a polymer or a monomer thereof which forms a three dimensional network structure through a physical or chemical crosslinking or a non-crosslinked non-linear polymer, in a solvent may be coated or sprayed on the anode active layer, or the anode active layer may be immersed in the composition for forming a polymer matrix, and then dried.

The specific types and contents of the non-crosslinked linear polymer and the polymer which forms a three dimensional network structure through a physical or chemical crosslinking are the same as explained above.

In addition, the solvent may depend on the type of polymer used. Specifically, it may be desirable to use a solvent which is easy to be mixed uniformly due to its solubility parameter similar to that of the above polymers and which has a low boiling point for the easy removal thereof, if possible. The specific example thereof includes acetone, tetrahydrofuran, methylene chloride, chloroform, dimethylformamide, N-methyl-2-pyrrolidone (NMP), cyclohexane, water, a mixture thereof, etc., but is not limited thereto.

Specifically, when the polymer matrix comprises a polysilsesquioxane by the organic-inorganic sol-gel reaction, the crosslinking may also be carried out by acid treatment or heat treatment. In the case of acid treatment, in order to prevent the contact with the lithium inside the negative electrode active layer, the polymer matrix may be prepared in advance on another substrate and then transferred to the negative electrode active layer comprising lithium.

In addition, when the polymer matrix comprises a three dimensional covalent organic framework by the coupling between two or more monomers having reactive multifunctional groups, it may be desirable to use a monomer having a functional group which is easy to be crosslinked even under a mild condition as the reactive multifunctional group.

In addition, the composition for forming a polymer matrix may further comprise inorganic filler for the purpose of improving the mechanical strength of the polymer matrix. The inorganic filler may be specifically silica, alumina, etc., and may preferably be contained in the amount of 0.1 to 10% by weight based on a total weight of the composition for forming a polymer matrix.

On the other hand, the method for coating the composition for forming a polymer matrix on the negative electrode active layer may be one typically known in the art, such as for example, dip coating, die coating, roll coating, comma coating, a mixed method thereof, etc.

The follow-up drying process may be preferably carried out at 150 to 250° C. under vacuum for 12 to 24 hours. In particular, when the coating is made on the thin lithium film and then dried, the drying is more preferably carried out at the melting point of lithium (about 180° C.) or less.

Typically, such negative electrode active material as a lithium metal shows high charging/discharging capacity, but also shows low reversibility and stability. Also, due to the volume change of electrode during the charging/discharging process of lithium secondary battery, the electrolyte solution may be lost or exhausted to make the continuous battery driving difficult.

On the contrary, the negative electrode prepared by the method according to the present invention has the polymer matrix and the protective layer comprising an electrolyte solution on the negative electrode active layer, thereby remarkably lowering the side reaction between the electrode active material and the electrolyte, which usually occurs under the extreme conditions such as charging, high temperature storage, etc. As a result, the exothermic heat due to the side reaction between the electrode and the electrolyte is decreased and the dendrite formation on the surface of electrode is inhibited to highly improve the battery stability. Also, since the protective layer has a polymer matrix, it may show excellent mechanical properties such as elongation, bending, etc. Thus, it may stably exist without any damage inside the battery although the charging/discharging process is continued.

Still another embodiment of the present invention provides a lithium secondary battery comprising the anode which is prepared by the method.

Specifically, the lithium secondary battery includes a positive electrode comprising positive electrode active material and the negative electrode comprising negative electrode active material, which are arranged to face each other, and an electrolyte solution which is interposed between the positive electrode and the negative electrode, wherein the negative electrode is the same as those described above.

The lithium secondary battery may be classified into a lithium ion battery, a lithium ion polymer battery and a lithium polymer battery depending on the types of separator and electrolyte used. It may also be classified into a cylindrical shape, a square shape, a coin-type, a pouch-type, etc. depending on the shape, and classified into a bulk type and a thin film type depending on the size.

Figure 1:
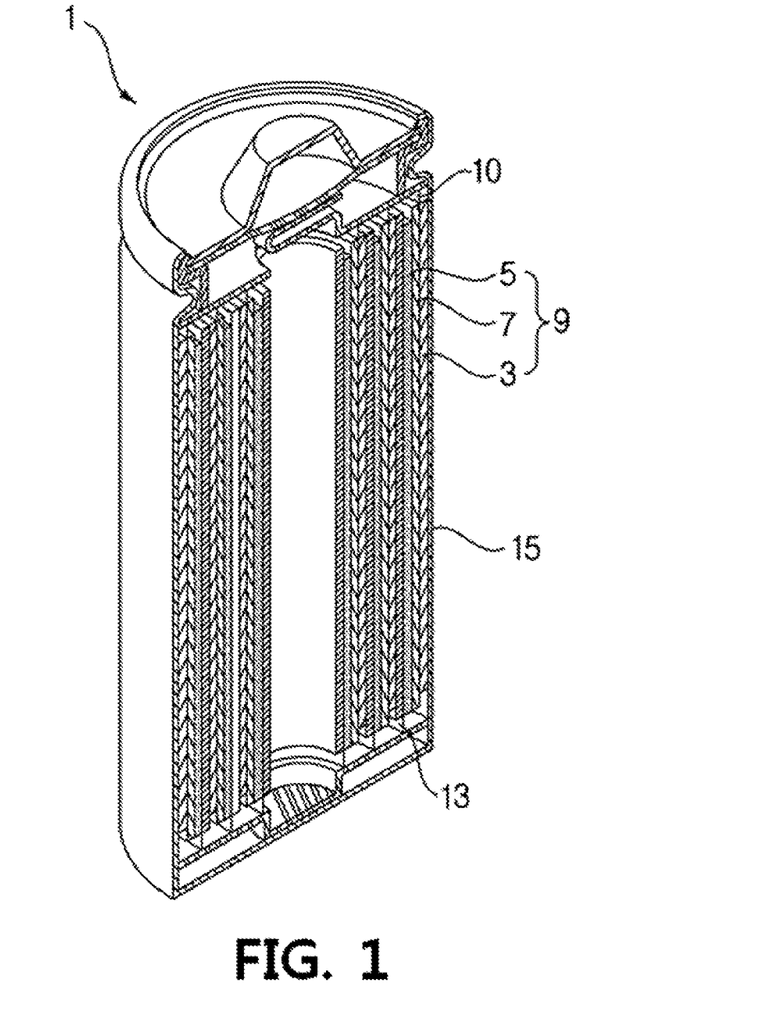
FIG. 1 is an exploded perspective view of the lithium secondary battery according to the present invention.

FIG. 1 is an exploded perspective view of the lithium secondary battery (1) according to the present invention. FIG. 1 is only an example for illustrating the present invention, and the present invention is not restricted thereto.

Referring to FIG. 1, the lithium secondary battery (1) may be prepared by disposing the negative electrode (3), the positive electrode (5), and the separator (7) between the negative electrode (3) and the positive electrode (5) to give an electrode assembly (9), placing the electrode assembly in the case (15) and injecting electrolyte (not shown) to make the negative electrode (3), the positive electrode (5) and the separator (7) be impregnated in the electrolyte.

Conductive lead members (10, 13) for collecting the current generated during the battery action may be attached to each of the negative electrode (3) and the positive electrode (5), and the lead members (10, 13) can induce the current generated from the positive electrode (5) and the negative electrode (3), respectively, to the positive electrode terminal and the negative electrode terminal.

The positive electrode (5) may be obtained by preparing a composition for forming a positive electrode active material layer through the mixing of a positive electrode active material, a conductive agent and a binder, and then applying and rolling the composition for forming a positive electrode active material layer on a positive electrode current collector such as an aluminum foil, etc. It is also possible that the positive electrode active material composition is cast on a separate support before a film peeled off from the support is laminated on a metal current collector to prepare a positive electrode plate.

As the positive electrode active material, a compound capable of reversible intercalation and deintercalation of lithium (lithiated intercalation compound) may be used. Specifically, a lithium-containing transition metal oxide may be preferably used. For example, one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0 \leq y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$ and $LiFePO_4$, or a mixture of two or more thereof may be used. Also, sulfides, selenides, halides, etc. besides the oxides may be used.

The conductive agent and the binder are the same as those described for the anode above.

The separator (7) may include those used as a separator in the ordinary lithium secondary battery without special limit. In particular, those having low resistance against the ion transfer of electrolyte and having excellent electrolyte solution-immersion ability are preferable. Specifically, a porous polymer film, for example, a porous polymer film made of a polyolefin-based polymer such as ethylene homopolymer, propylene homopolymer, ethylene/butene copolymer, ethylene/hexene copolymer, ethylene/methacrylate copolymer, etc. may be used alone or used by laminating them. Or, a typical porous non-woven fabric, for example, a non-woven fabric made of a glass fiber having a high melting point, a polyethylene terephthalate fiber, etc. may be used. But, the separator is not limited to the above.

In addition, the electrolyte solution may be the same as those described for the formation of a protective layer above.

In the examples herein, a cylindrical lithium secondary battery (1) is exemplified, but the technique of the present invention is not limited to the cylindrical lithium secondary battery (1), and any shape capable of acting as a battery is possible.

The lithium secondary battery including the negative electrode active material according to the present invention shows the stable and excellent discharge capacity, cycle life characteristics and modulus characteristics, and thus is useful for the areas of portable devices such as cell phone requiring the fast charge rate, notebook computer, digital camera, camcorder, etc., electric vehicles such as hybrid electric vehicle (HEV), plug-in HEV (PHEV), etc., and medium to large energy storage systems.

Mode for Invention

Hereinafter, the examples of the present invention will be illustrated in detail so that a person of ordinary skill in the art may easily practice the invention. However, the present invention can be realized in a variety of different ways and is not restricted to the examples provided herein.

[Preparation 1: Preparation of Negative Electrode]

Example 1

Sylgard 184 monomer purchased from Dow Corning Corporation and a hardener were mixed in the weight ratio of 10:1 to 10:5. In order to control the thickness to the level of 1 to 10 um, hexane was added to dilute the mixture to lower the concentration. The solution thus prepared was applied on a lithium metal thin film, and then thermally cured at 50 to 100° C. for 1 to 12 hours. At this time, the higher the temperature the shorter the time for curing is.

Example 2

The single monomer having the following Formula 1 was subjected to a sol-gel reaction to form a polysilsesquioxane.

[Formula 1]

(In Formula 1, $R_1$ is an oligoethylene glycol)

The prepared polysilsesquioxane in the amount of 10% by weight was dissolved in THF to give a composition for forming a polymer matrix. This composition was applied on a lithium metal thin film as the negative electrode active layer and then cured at 100° C. to form a polymer matrix.

At this time, the time for curing and the degree of cure might be shortened by changing the solvent to an alcohol or by adding an acid or a base to the solution, wherein the composition might be cured on another substrate such as a Teflon sheet or a PET sheet and then transferred to the thin lithium film considering the reactivity of lithium.

Example 3

On a lithium metal thin film as the negative electrode active layer, the monomer of Formula 2 and the compound of Formula 3a were coupled as shown in Reaction Scheme 1 above to form a three dimensional covalent organic framework.

In the Formulas 2 and 3a of the Reaction Scheme 1, R and R' were oligoethylene glycols, X was amino group, and Y was isocyanate group. Under room temperature and nitrogen atmosphere, the compounds of Formulas 2 and 3a were dissolved in anhydrous DMF in the equivalent ratio of 1:1 (Concentration 0.04 g/mL). After stirring, the solution existed in a sol state usually until 3 to 4 days and then in a gel state. The solution in a sol state was applied on the thin film and the solvent was dried to give a three dimensional porous membrane.

Example 4

Polystyrene sulfonic acid of which sulfonic acid group ($SO_3H$) at the polymer side chain end was replaced by $SO_3Li$ was dissolved in THF in the concentration of 10% by weight to give a composition for forming a polymer matrix. This composition was applied on a lithium metal thin film as the negative electrode active layer and then dried at 60° C. to form a polymer matrix.

Comparative Example 1

A lithium metal thin film was used as the negative electrode active layer.

[Preparation 2: Preparation of Lithium Secondary Battery]

Using the electrodes prepared in the examples and the comparative example, a lithium full symmetric cell was manufactured. A porous polyethylene separator was interposed between the two lithium electrodes to give an electrode assembly. This electrode assembly was placed in the inside of a case, and an electrolyte solution was injected into the inside of the case, thereby preparing a lithium secondary battery. At this time, the electrolyte solution was impregnated even in the polymer matrix which was formed in the electrode.

The electrolyte solution was prepared by dissolving lithium hexafluorophosphate ($LiPF_6$) in the organic solvent consisting of ethylene carbonate/dimethyl carbonate (the volume mixing ratio of EC/EMC=1/1) in the concentration of 1 M.

Figure 2:
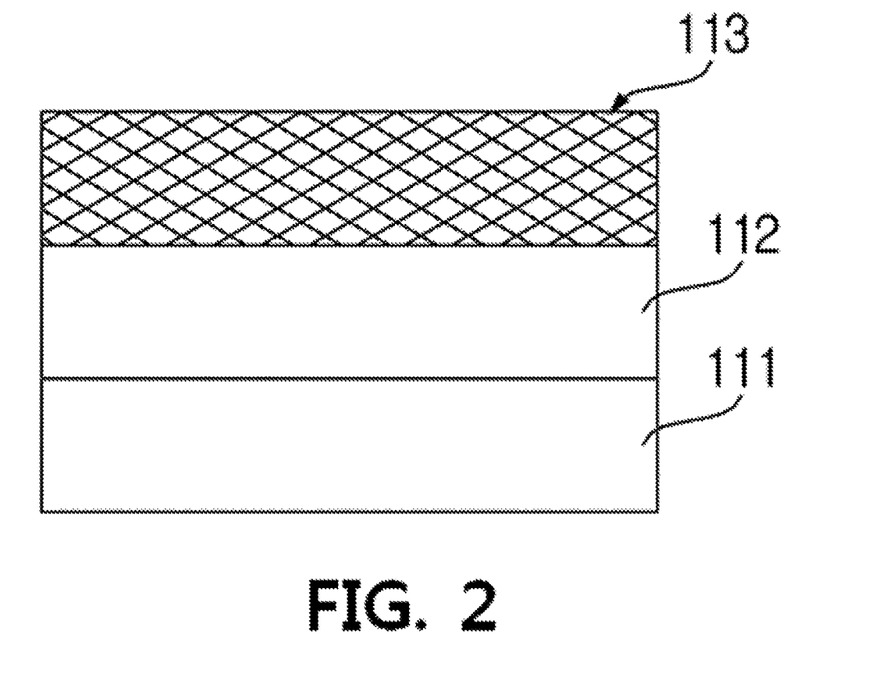
FIG. 2 is a diagram of the electrode prepared in the example.
Figure 3:
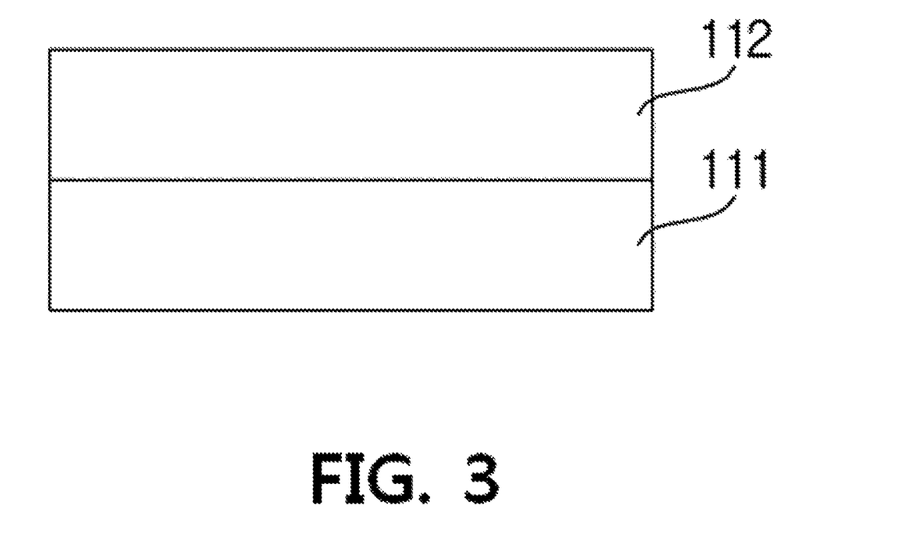
FIG. 3 is a diagram of the electrode prepared in the comparative example.

The diagram of the electrode as prepared above is shown in FIGS. 2 and 3. FIG. 2 is a diagram of the electrode according to the example and FIG. 3 is that of the electrode according to the comparative example. Referring to FIGS. 2 and 3, in the electrode according to the example, the polymer matrix (113) was formed on the lithium metal thin film (112) which was placed on the current collector (111), and the electrolyte solution was accumulated in the inside of the polymer matrix (113).

[Experiment 1: Evaluation of Cycle Life Characteristics of Lithium Secondary Battery]

Figure 4:
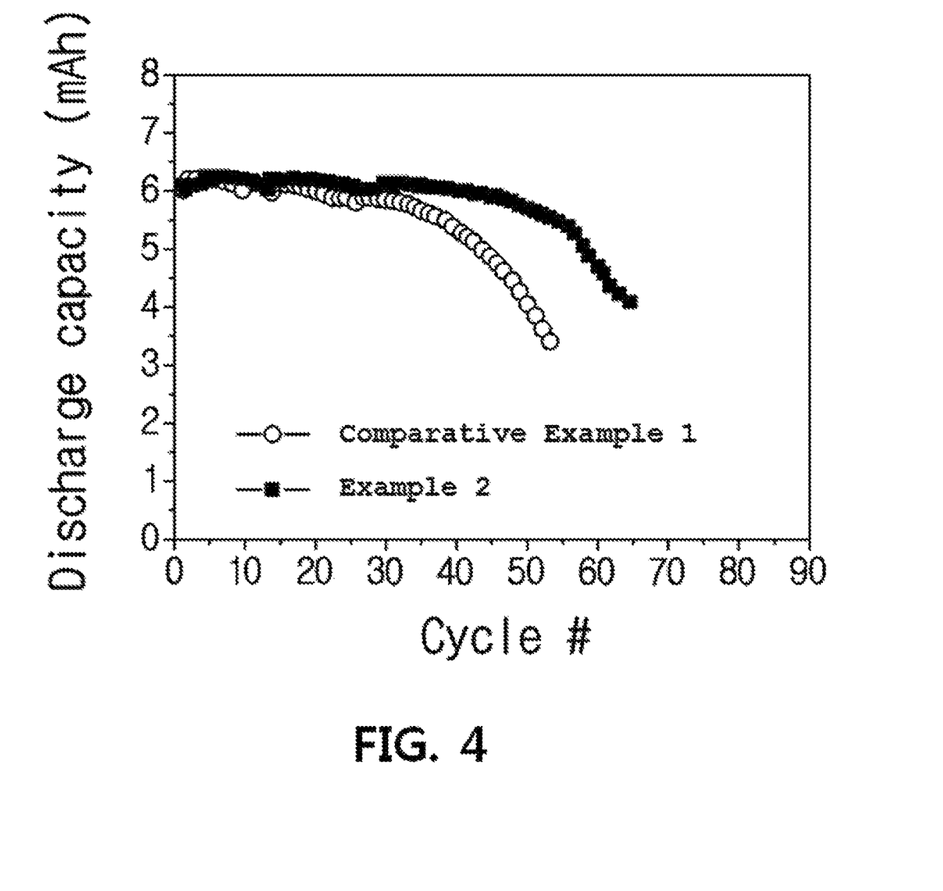
FIG. 4 is a graph illustrating the cycle life of the lithium secondary battery prepared in the example and the comparative example.

The cycle life of the lithium secondary batteries prepared in the examples and the comparative example was evaluated and the results are shown in FIG. 4.

Furthermore, the time at which the discharge capacity was sharply lowered in the cycle life and the electrolyte uptake were measured, and the results are shown in Table 1 below.

TABLE 1

|  | Electrolyte uptake (wt. %)[1] | The time at which the discharge capacity is sharply lowered |
| --- | --- | --- |
| Com. Ex. 1 | 0 | After 30 cycles |
| Ex. 1 | 400~1100 | After 45 cycles |
| Ex. 2 | 500~900 | After 40 cycles |
| Ex. 3 | 40~100 | After 42 cycles |

[1]Electrolyte uptake (wt. %): The mass before and after each of the polymer matrix having the diameter of 19 mm was immersed in the electrolyte solution was measured, and the increment was expressed in %.

As shown in FIG. 4 and Table 1, in case of the comparative example which used the electrode not including the polymer matrix containing electrolyte solution, the cell was analyzed after the end of the cycle and it was confirmed that the electrolyte was completely consumed. However, in case of the example which used the electrode including the polymer matrix containing electrolyte solution, the cell was analyzed after the end of the cycle and it was confirmed that some electrolyte was remained.

Therefore, in comparison to Comparative Example 1, the electrodes prepared in the examples showed improvement in the porosity, electrolyte uptake and cycle life depending on the presence of the polymer matrix.

The desirable examples of the present invention were described in detail above. However, the scope of the present invention is not limited thereto. Various changes and modifications by one of ordinary skill in the art from the basic concept of the present invention as defined in the following claims also fall within the scope of the present invention.

SYMBOLS IN DRAWINGS

1: Lithium Secondary Battery
3: Negative Electrode
5: Positive Electrode
7: Separator
9: Electrode Assembly
10, 13: Lead Members
15: Case
111: Current Collector
112: Lithium Metal Thin Film
113: Polymer Matrix

INDUSTRIAL APPLICABILITY

The present invention relates to a negative electrode for lithium secondary battery and a lithium secondary battery including the same. The anode has no concern about loss of electrolyte and the resulting deterioration of battery life characteristics even during the repetitive charging/discharging of the battery and has improved stability due to the inhibition of growth of lithium dendrite.

The invention claimed is:

1. A negative electrode for lithium secondary battery comprising:
   a negative electrode active layer comprising a lithium metal, and
   a protective layer disposed on the negative electrode active layer,
   wherein the protective layer comprises a polymer matrix having a three dimensional crosslinked network structure of polymer or including a non-crosslinked linear polymer; and an electrolyte in the polymer matrix in the amount of 100 to 1000 parts by weight, based on 100 parts by weight of the polymer matrix, and
   wherein the polymer matrix comprises one substituent selected from the group consisting of sulfonic acid group ($SO_3H$), phosphoric acid group ($PO_4H_2$), carbonic acid group ($CO_3H$) and combinations thereof, and an anionic polymer electrolyte in which some or all of the substituents are self-doped with lithium.

2. The negative electrode for lithium secondary battery of claim 1, wherein the protective layer comprises a porous polymer matrix having the three dimensional crosslinked network structure of polymer and the electrolyte is contained inside the pore of the porous polymer matrix.

3. The negative electrode for lithium secondary battery of claim 2, wherein the porous polymer matrix has a porosity of 5 to 80% by volume.

4. The negative electrode for lithium secondary battery of claim 1, wherein the three dimensional crosslinked network structure is formed through a cross-link selected from the group consisting of chemical crosslinking by a branch chain between polymers, coupling between one or more monomers having reactive multifunctional groups, physical crosslinking of cluster domains formed by phase separation of block copolymers, and ionic crosslinking of ionomers.

5. A negative electrode for lithium secondary battery comprising:
   a negative electrode active layer comprising a lithium metal, and
   a protective layer disposed on the negative electrode active layer,
   wherein the protective layer comprises a polymer matrix having a three dimensional crosslinked network structure of polymer or including a non-crosslinked linear polymer; and an electrolyte in the polymer matrix in the amount of 100 to 1000 parts by weight, based on 100 parts by weight of the polymer matrix, and
   wherein the polymer matrix comprises a crosslinked polymer of polydimethylsiloxane or its derivatives.

6. A negative electrode for lithium secondary battery comprising:
   a negative electrode active layer comprising a lithium metal, and
   a protective layer disposed on the negative electrode active layer,
   wherein the protective layer comprises a polymer matrix having a three dimensional crosslinked network structure of polymer or including a non-crosslinked linear polymer; and an electrolyte in the polymer matrix in the amount of 100 to 1000 parts by weight, based on 100 parts by weight of the polymer matrix, and
   wherein the polymer matrix comprises a crosslinked polysilsesquioxane.

7. The negative electrode for lithium secondary battery of claim 1, wherein the protective layer has a structure in which non-crosslinked linear polymers having a weight average molecular weight of 1,000,000 g/mol or more are entangled with each other, and the electrolyte is loaded in the structure.

8. The negative electrode for lithium secondary battery of claim 1, wherein the protective layer comprises a non-crosslinked linear polymer selected from the group consisting of polyethylene oxide, polypropylene oxide, polyacrylonitrile, polyvinylidene fluoride-hexafluoropropylene, polyvinylidene fluoride-trichloroethylene, polymethylmethacrylate, polystyrene-acrylonitrile copolymer, polyvinyl chloride, polyvinylpyrrolidone, polyvinyl acetate, polyethylene vinyl acetate copolymer, and mixtures thereof.

9. The negative electrode for lithium secondary battery of claim 1, wherein the protective layer has the thickness of 1 nm to 10 μm.

10. The negative electrode for lithium secondary battery of claim 1, wherein the electrolyte is absorbed in the polymer which forms the polymer matrix.

11. A lithium secondary battery comprising:
   a negative electrode of claim 1;
   a positive electrode facing the negative electrode;
   a separator interposed between the positive electrode and the negative electrode; and
   a non-aqueous electrolyte.

* * * * *